(12) United States Patent
Gudenburr et al.

(10) Patent No.: US 8,335,368 B2
(45) Date of Patent: Dec. 18, 2012

(54) BI-DIRECTIONAL DUAL-SPEED DOCUMENT PROCESSOR

(75) Inventors: John Gudenburr, Canton, MI (US);
William L. Kozlowski, Novi, MI (US);
Michael J. Moore, Beverly Hills, MI (US)

(73) Assignee: Burroughs, Inc., Plymouth, MI (US)

( * ) Notice: Subject to any disclaimer, the term of this patent is extended or adjusted under 35 U.S.C. 154(b) by 819 days.

(21) Appl. No.: 12/470,532

(22) Filed: May 22, 2009

(65) Prior Publication Data
US 2010/0296720 A1 Nov. 25, 2010

(51) Int. Cl.
*G06K 9/00* (2006.01)
(52) U.S. Cl. ........................................ 382/140
(58) Field of Classification Search .......... 382/112–113, 382/135–140; 358/495–500; 235/375–385; 705/35–48; 715/207–212
See application file for complete search history.

(56) References Cited

U.S. PATENT DOCUMENTS

2006/0115288 A1* 6/2006 Roof .............................. 399/67
2009/0323140 A1* 12/2009 Moore et al. ................. 358/497

* cited by examiner

*Primary Examiner* — Atiba O Fitzpatrick
(74) *Attorney, Agent, or Firm* — Honigman Miller Schwartz and Cohn LLP (57) ABSTRACT

A document processor and method of use are disclosed. In one aspect, a document processor includes a path of travel of a document, a magnetic ink character reader, and an image scanner. The magnetic ink character reader is located along the path of travel and positioned to read magnetic characters printed on a document passing along the path of travel. The image scanner is located along the path of travel and oriented to capture an image of a surface of a document passing along the path of travel. The document processor also includes at least one drive mechanism located along the path of travel and configured to guide a document along the path of travel in a first direction during operation of the magnetic ink character reader, and further configured to guide the document along the path of travel in a second direction opposite the first direction during operation of the image scanner. The drive mechanism is configured to guide the document along the path of travel in the first direction at a first speed, and guide the document along the path of travel in a second direction at a second speed.

10 Claims, 9 Drawing Sheets

BI-DIRECTIONAL DUAL-SPEED DOCUMENT PROCESSOR

TECHNICAL FIELD

The present disclosure relates to methods and systems for document processing. In particular, the present disclosure relates to a bi-directional dual speed document processor, and methods of use.

BACKGROUND

A transfer of funds can lag a business transaction, such as a purchase, by many days if a check or other negotiable instrument is used. This is because routing and payment information must be read and processed, and the document must be transferred to a bank for funds to be exchanged. It is advantageous to companies or institutions accepting checks as a form of payment to process those checks as soon as possible after a transaction occurs, so that those companies can obtain and use the funds related to that transaction. There is therefore an increasing desire to place check processing systems at places of business, thereby allowing the business to digitize the information on the check. This eliminates the requirement that the business send the physical check to the source bank or other financial institution prior to getting paid, reducing transport delays. The drive to 'truncation', or reduction in transport time, has been accelerated by legislative measures in the United States and other nations. For example, the U.S. Check Clearing for the 21st Century Act 2003 (HR 1474 S1334), or 'The Check 21 Act', which went into effect in October 2004, enacted legal frameworks and standards for the electronic interchange of digital facsimiles of original financial instruments within the U.S.

Check processing systems operating in accordance with the Check 21 Act are typically required to read the routing information printed on a check and scan an image of the front side of the check or other negotiable instrument. Routing information is typically captured by reading characters printed on the check with a magnetic ink character reader, and images are typically captured using an image scanner. These two operations generally are performed on a document as the document is passed through a document processor, at a predefined speed, past a stationary magnetic ink character reader and image scanner.

Additionally, certain check processing systems developed for use under the Check 21 Act are intended to be small and low-cost, to encourage their use and adoption by businesses. However, these check processing systems can also be relatively low speed, due to the lower volume of checks processed at a business as compared to the number of checks processed at a financial institution. For example, a rate of 2-3 checks per minute would be unacceptable at a financial institution, but may be more than sufficient for a business.

Magnetic ink character reading reliability improves with increased rate of movement of a document through a document processor. Generally, at least a certain baseline speed (typically 5-10 inches per second) is required. As this rate of movement increases, an image scanner must be able to scan at the rate at which documents are passed through the document processor (i.e. with the image scanner and the magnetic ink character reader operating concurrently). For this and other reasons, existing check processing systems require use of a costly image scanner component, so that image scanning can be performed at a speed sufficient for reliable concurrent magnetic ink character reading. The cost of the image scanner is proportional to the speed of that image scanner, and represents a large portion of the overall cost of a document processor.

For these and other reasons, improvements are desirable.

SUMMARY

In accordance with the present disclosure, the above and other problems are solved by the following:

In a first aspect, a document processor includes a path of travel of a document, a magnetic ink character reader, and an image scanner. The magnetic ink character reader is located along the path of travel and positioned to read magnetic characters printed on a document passing along the path of travel. The image scanner is located along the path of travel and oriented to capture an image of a surface of a document passing along the path of travel. The document processor also includes at least one drive mechanism located along the path of travel and configured to guide a document along the path of travel in a first direction during operation of the magnetic ink character reader, and further configured to guide the document along the path of travel in a second direction opposite the first direction during operation of the image scanner. The drive mechanism is configured to guide the document along the path of travel in the first direction at a first speed, and guide the document along the path of travel in a second direction at a second speed.

In a second aspect, a method of processing documents is disclosed. The method includes receiving a document in a document processor and passing the document through the document processor along a path of travel in a first direction at a first speed and concurrently performing a first document processing operation with a first device in the document processor. The method also includes passing the document through the document processor along the path of travel in a second direction opposite the first direction and at a second speed slower than the first speed and concurrently performing a second document processing operation with a second device in the document processor, wherein the second device is incapable of operation at the first speed.

In a third aspect, a bi-directional check processor is disclosed. The check processor includes a housing containing a plurality of rollers cooperating to at least partially define a path of travel of a check through the housing. The check processor also includes a magnetic ink character reader located along the path of travel, the magnetic ink character reader positioned to read magnetic characters printed on a front surface of the check passing along the path of travel. The check processor further includes a contact image scanner located along the path of travel and oriented to scan a front surface of a check passing along the path of travel. The check processor also includes a plurality of drive rollers located along the path of travel, the plurality of drive rollers configured to guide the check along the path of travel in a first direction during operation of the magnetic ink character reader and further configured to guide the check along the path of travel in a second direction opposite the first direction during operation of the contact image scanner. The plurality of drive rollers are configured to guide the check along the path of travel in the first direction at a first speed, and guide the check along the path of travel in a second direction at a second speed lower than the first speed.

In a fourth aspect, a method of processing checks is disclosed. The method includes receiving a check in a check processor, and passing the check through the check processor along a path of travel in a first direction at a first speed. The method also includes, while passing the check through the check processor in the first direction, reading magnetic ink characters printed on the check using a magnetic ink character reader in the check processor. The method further includes, after the magnetic ink characters printed on the check are read by the magnetic ink character reader, halting movement of the check. The method includes passing the check through the check processor in a second direction opposite the first direction at a second speed lower than the first speed, and while passing the check through the check processor in the second direction, capturing an image of the front side of the check using a contact image scanner. In this method, the contact image scanner is incapable of operation at the first speed.

DETAILED DESCRIPTION

Various embodiments of the present disclosure will be described in detail with reference to the drawings, wherein like reference numerals represent like parts and assemblies throughout the several views. Reference to various embodiments does not limit the scope of the invention, which is limited only by the scope of the claims attached hereto. Additionally, any examples set forth in this specification are not intended to be limiting, but instead set forth some of the many possible embodiments for the claimed invention.

In general, the present disclosure relates to a document processor, such as a check scanner. Specifically, the present disclosure relates to a document processor that provides dual speed scanning to provide improved information capture from documents. In certain aspects, the document processor is bi-directional, and operates at different speeds depending upon the direction in which the document passes through the document processor. Different functionality can be activated as well, based on the direction or speed of travel of the document. For example, in a first direction, a higher speed can be used to capture magnetic character information; in a second direction, a lower speed of travel can be used to capture one or more images of the document.

Figure 1:
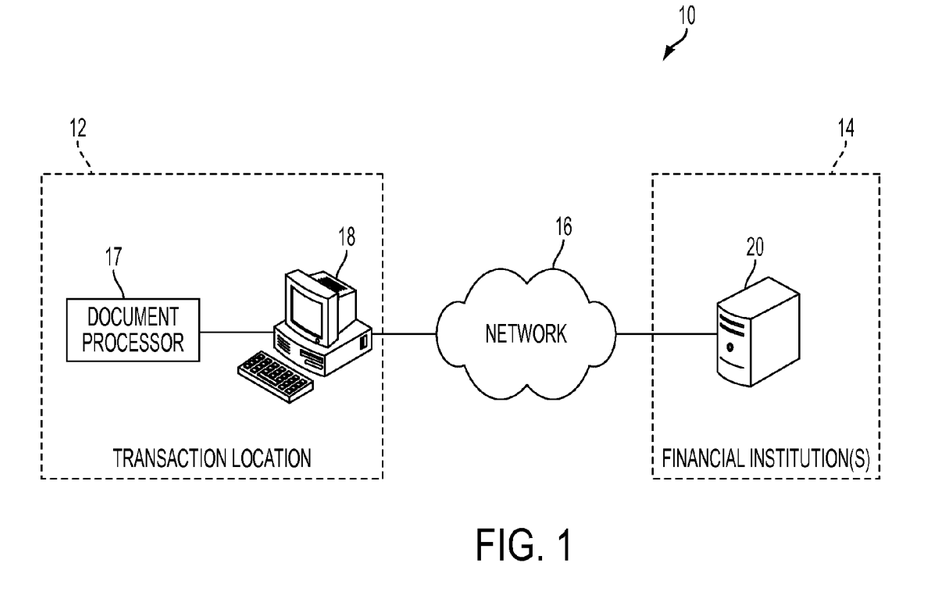
FIG. 1 is a schematic depiction of a network in which an electronic financial transaction may be placed, in accordance with the present disclosure.

One specific example of a system in which such a bidirectional document processor may be used is shown in FIG. 1. FIG. 1 illustrates a schematic view of a network 10 in which a financial transaction may take place, according to a possible embodiment of the present disclosure. The network 10 generally includes one or more transaction locations 12 and financial institutions 14, communicatively connected by a network, shown as the internet 16. A transaction location 12 may be any of a number of places of business at which a financial transaction may take place, such as for purchase or sale of goods and services. Example transaction locations may include restaurants, supermarkets, bank teller windows, ATM's or other places of business or monetary exchange. Each transaction location 12 includes a document processor 17 interconnected with a computing system 18. The document processor 17 is arranged to provide the transaction location with the ability to electronically acquire information about a printed document, such as a check used for payment in exchange for goods and/or services. In certain embodiments, the document processor 17 can be a check scanner, which is sized and designed to be a low cost solution to read account information on personal checks and scan images of one or both sides of the check. Example document processors useable in the network 10 are described below in conjunction with FIGS. 3-8.

The computing system 18 can be any of a number of types of computing systems, such as a general purpose personal computer, or a specialized computer such as a cash register or inventory system. The computing system 18 can interconnect with the document processor 17 by any of a number of standard or specialized communication interfaces, such as a USB, 802.11 a/b/g network, RF, infrared, serial, or other data connection. In certain embodiments, the computing system 18 runs an application configured to control the document processor 17; in further embodiments, the computing system 18 receives data from the document scanner and stores and/or communicates the data (images, text, or other information) to other systems to which it is interconnected.

Each of the financial institutions 14 generally includes a computing system 20, which is configured to receive electronic records of financial transactions relevant to the financial institutions. The computing system 20 can be any of a number of types of computing systems capable of storing and managing financial transactions; in the embodiment shown, the computing system is a server system comprising one or more discrete computing units interconnected, as is known in the art.

The electronic records can be electronic transaction records, and can include scanned copies of documents memorializing financial transactions. In a particular example, an electronic record can reflect a purchase made with a check, in which the electronic record includes the relevant information on the face of the check, the routing and institution number printed on the check, and an image of one or more sides of the check, used to validate the other information and to display relevant endorsements of the check. Other electronically captured transactions, such as credit card transactions, contracts, or other negotiable instrument transactions may be tracked using the system 20 as well.

The internet connection 16 depicted can be any of a number of WAN, LAN, or other packet based communication networks such that data can be shared among a number of computing systems or other networked devices. Furthermore, although in the embodiment shown two computing systems 18, 20 at different, specific locations are depicted, the computing devices and/or the document processor 17 may be located at the same location or within the same network.

Figure 2:
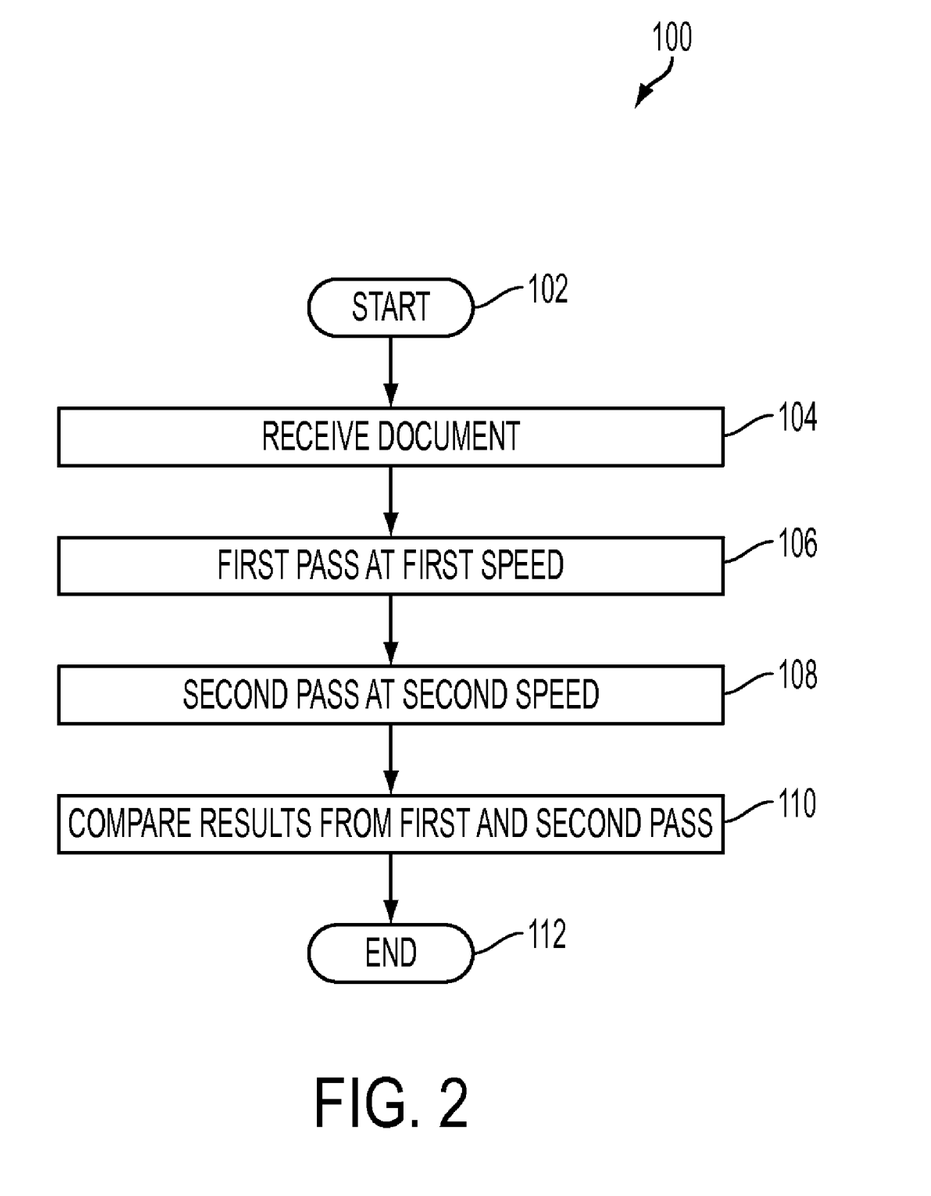
FIG. 2 is a flowchart illustrating methods and systems for operating a document processor according to a possible embodiment of the present disclosure.

FIG. 2 illustrates methods and systems for document processing, according to a possible embodiment of the present disclosure. The methods and systems 100 provide an example workflow for processing documents using a dual-speed, bi-directional document processor as disclosed herein. Additional details regarding example document processors which may perform the methods and systems are disclosed in FIG. 3-8, below. The system 100 is instantiated at a start operation 102, which corresponds to initial insertion of a document (e.g. by a user or automated feeder mechanism) for processing into a document processor.

A receive document module 104 receives the document to be processed into a path of travel of documents. The path of travel can be, in various embodiments, defined by a housing, guides, pressure rollers, drive rollers, and other mechanical components arranged to guide paper documents along a predetermined route through the document processor. The receive document module can be manually activated (e.g. by pressing a "start" button on a document processor) or by automatically detecting the presence of the received document.

A first processing module 106 passes the document through the document processor. The document is passed along the path of travel, such that it is routed past a number of document processing components. In an example document processor used for processing checks, the document processing components can include a magnetic ink character recognition (MICR) reader, a scanner (e.g. a contact image scanner), and other components. The first processing module 106 performs a first processing operation on the document as the document is passed along the path of travel at a first speed. The first speed is selected to be coordinated with the first processing operation, such that the first speed allows for adequate performance of the first processing operation.

For example, in certain embodiments, the first processing operation can be a magnetic ink character read operation. In such an instance, increased speed of a document can result in improved reliability in reading the character. Typically, in the case of a magnetic ink character read operation, a document will be moved past the MICR reader at sufficient speed that the reader can recognize the characters, typically a linear document speed of at least about 5-10 inches per second. Faster document speeds will allow for improved character recognition, while slower document speeds will increase the error rate for MICR character recognition.

A second document processing module 108 passes the document along the path of travel in a second direction, opposite the first direction, while performing a second document processing operation. The second document processing module 108 typically passes the document back through the document processor along the path of travel at a second speed, and operates at a selected, coordinated speed such that the second document processing operation can be performed successfully.

For example, in certain embodiments, the second processing operation can be an image scanning operation. In such an instance, a contact image scanner can be used. Contact image scanners are typically rated to operate at a certain speed, and cost increases exponentially with that speed. In these embodiments, the second speed (i.e. the speed for the "return pass") of the document processing module is matched so that it is at least as slow as the maximum speed of operation of the contact image sensor, so that a usable image can be obtained. Typical speeds for low cost contact image scanners are in the range of 2-3 inches per second of linear document speed.

In certain embodiments in which a contact image scanner is used for a scanning operation as the second document processing operation, a contact image sensor is selected which operates slower than an acceptable MICR reading level. In such cases, the contact image scanner is considered herein to be "inoperable" at the MICR reader speed, in that it will operate and capture an image, but that image will have low fidelity and likely be unusable. Similarly, if the contact image scanner is this slow, the MICR reader may be said to be "inoperable" at the speed of the contact image scanner, because read errors increase at such a speed (typically less than about 5 inches per second).

Alternatively, the second operation may be operable at a second speed where the first processing operation is also operable (although preferably still different from the first speed matched to the first processing operation). In such an embodiment, the second document processing module 108 can include processing of the document using the same components as performed during the first document processing module 106. For example, if a sufficiently fast contact image scanner is used, a MICR read operation can be performed during the first document processing module 106 at the first speed, and also during the second document processing module 108 at the second speed.

Figure 3:
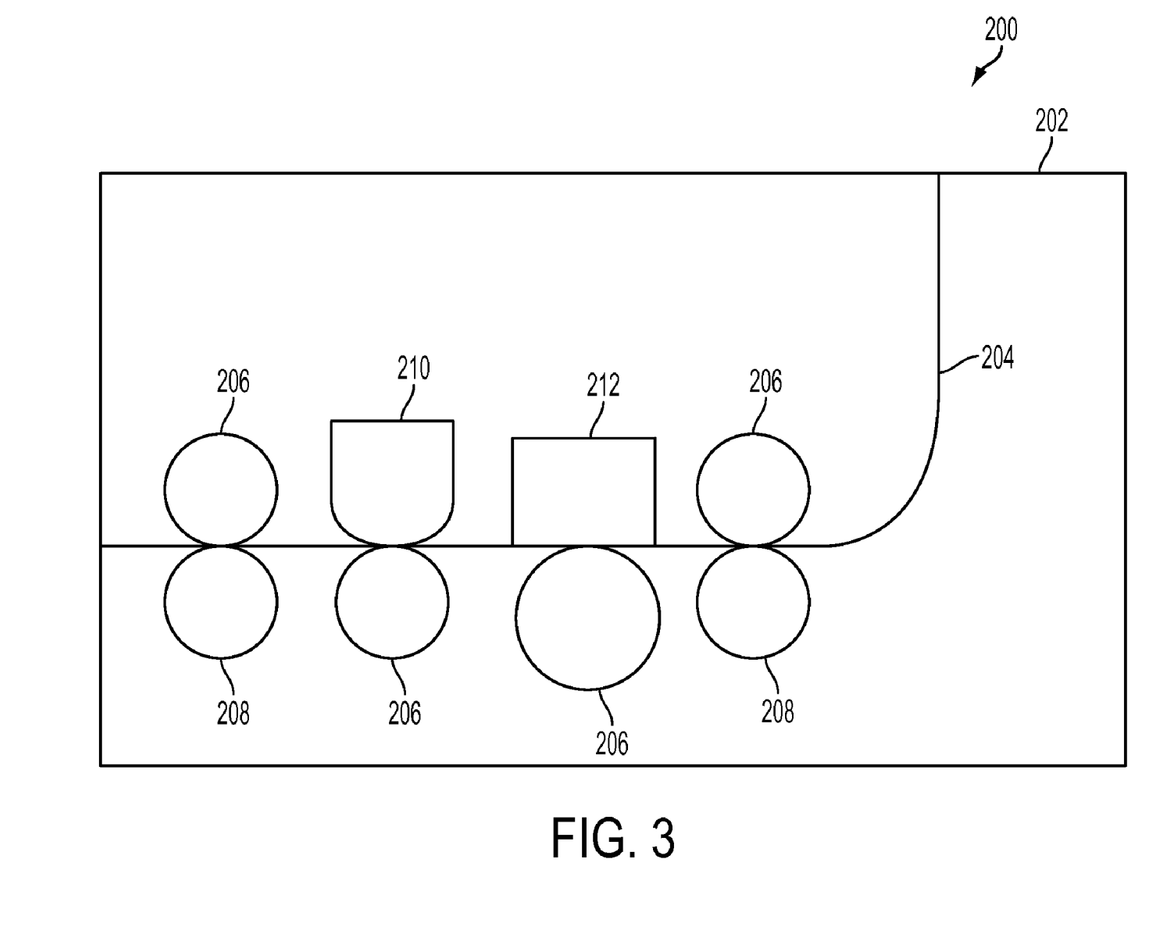
FIG. 3 is a side schematic view of components included within a document processor according to a possible embodiment of the present disclosure.
Figure 4:
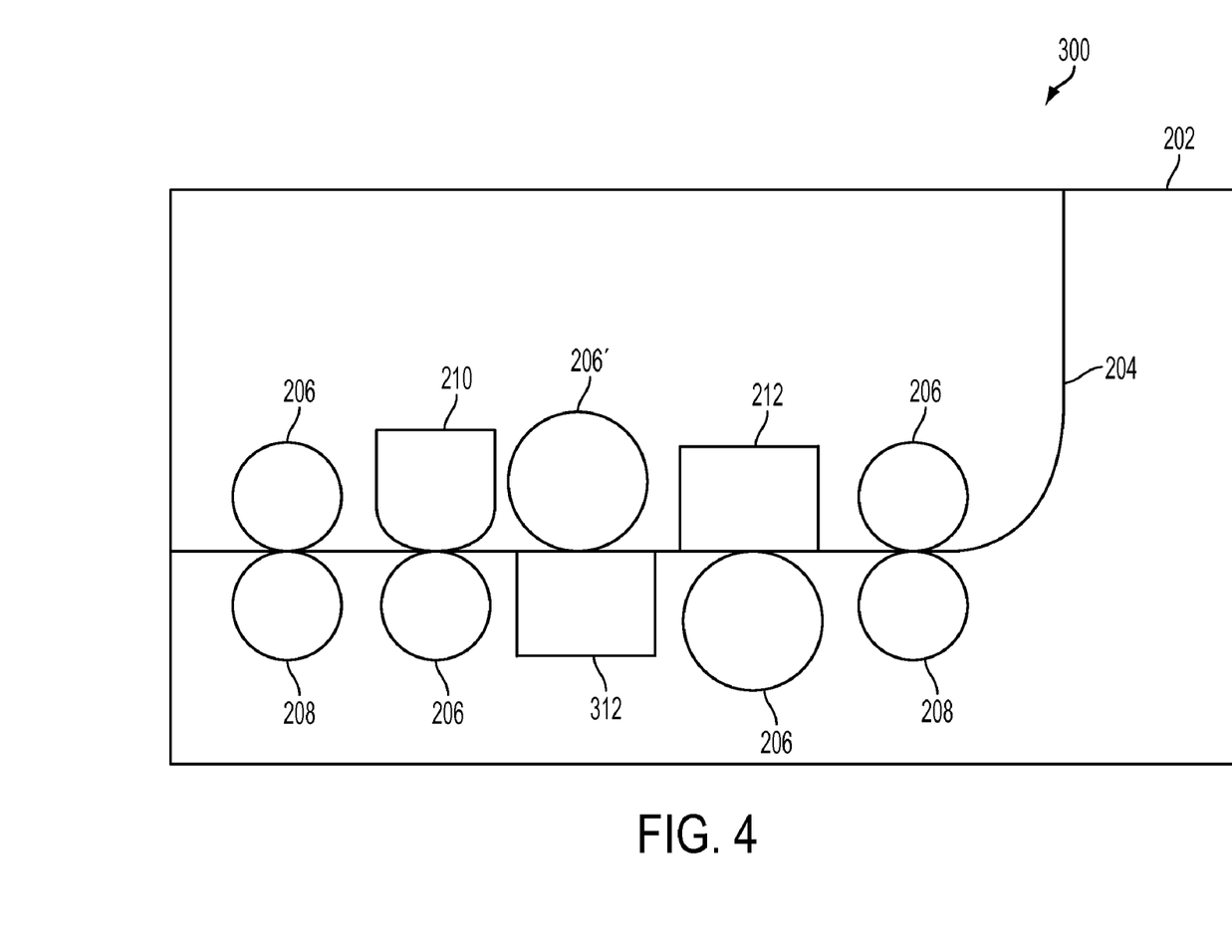
FIG. 4 is a side schematic view of components included within a document processor according to a further possible embodiment of the present disclosure.

Typically, the second document processing module 108 is performed by the document processor after the document has passed through at least the majority of the path of travel, such that the document has passed all document processing components within the document processor. For example, a drive roller (e.g. as shown in FIGS. 3-4, below) can be located after the document processing components in the first direction, along the path of travel. The drive roller can be halted after the document has passed each of the document processing components and the first document processing module 106 is performed. The drive roller's direction can then be reversed and its rotational rate changed (thereby changing the linear speed and direction of the document) for further processing by the same or other components within the document processor by the second document processing module 108.

In other examples of document processors, either of the first and second document processing operations can include different operations, such as printing, franking, or other processing. Furthermore, one or both of the first and second document processing operations can be arranged to operate on one or both sides of the document (e.g. to scan both the front and rear sides of a document, as illustrated in the example document processor of FIG. 4, below).

After operation of the first and second document processing modules 106, 108, a comparison module 110 optionally included in the system 100 can be used to compare results from those modules. Typically, the comparison module 110 can be included and used in a document processor operating at a sufficient speed that the first document processing operation can be performed during both the first and second document processing modules 106, 108. For example, the comparison module 110 can perform a validation on read MICR characters to determine whether the same characters are read during operation of each module.

Operational flow in the system is terminated at an end operation 112, which signifies completed processing of the document by the document processor. At this point, the document is returned to the user of the document processor for storage, destruction, or forwarding to a financial institution.

FIGS. 3-4 are schematic side view diagrams of a document processor, according to two alternative embodiments of the present disclosure. FIG. 3 illustrates a document processor 200, such as can be used as a check processor at a place of business. In this embodiment, the document processor 200 includes a housing 202 having a path of travel 204 of documents passing through. The path of travel 204 is at least partially defined by a number of rollers located on opposed sides of the path, including a plurality of pinch rollers 206 and drive rollers 208, as well as document processing components. In the embodiment shown, the document processing components include a MICR reader 210 and an image scanner, shown as a contact image scanner 212.

The pinch rollers 206 are allowed to freely rotate within the document processor, and are biased toward the path of travel 204 to hold documents within the path of travel while processed. The pinch rollers 206 can be spring-biased or otherwise biased toward the path of travel, and are generally placed at least opposite each of the drive rollers 208, MICR reader 210, and contact image scanner 212 to ensure that the document passes close to each of those components to ensure proper document movement and image/character capture.

The drive rollers 208 are spaced along the path of travel 204 such that at least one drive roller can engage a document at all times while the document is passing along the path of travel 204. The drive rollers 208 operate in unison, and can be driven either by independent motors (e.g. a stepper motor or other type of motor) or a common motor and linkage. The distance between the drive rollers defines the minimum length of document able to be processed by the document processor 200, to ensure that at least one of the drive rollers 208 is constantly in contact with the document to guide it along the path of travel. In the embodiment shown, two drive rollers 208 are used; however, in the case of a longer path of travel or a shorter desired minimum length document, additional drive rollers could be included in the document processor 200.

Each drive roller 208 is opposed by a pinch roller 206 on an opposite side of the path of travel 204. Although, in the embodiment shown, the drive rollers 208 are located on a same side (opposite the MICR reader 210 and contact image scanner 212), in various embodiments the drive rollers can be placed on the opposite side, or alternated sides. Various configurations are possible if more drive rollers are included in the document processor 200.

The MICR reader 210 and contact image scanner 212 are located adjacent to the path of travel 204, and are oriented to sense characters and capture images, respectively, of documents passing those components. In the embodiment shown, the MICR reader 210 and contact image scanner 212 are located above the path of travel, to operate on a front side of a document that is inserted face up into the side of the document processor 200. In alternative embodiments, the MICR reader 210 and contact image scanner 212 can be located on opposite sides of the path of travel to operate on opposite sides of a document. Other document processing equipment (e.g. a printer, franking roller, or other components) can be included within the housing as well to provide further document processing capabilities.

FIG. 4 illustrates a further document processor 300, according to an alternative embodiment of the present disclosure. The document processor 300 generally corresponds to the document processor 200, and includes like components (housing 200, path of travel 204, pinch and drive rollers 206, 208, and document processing components 210, 212). In this embodiment, an additional contact image scanner 312 is located on a side opposite the contact image scanner 212, to allow capture of both front and rear images of the document. The contact image scanner 312 is opposed by an additional pinch roller 206' to ensure that a document passes near the scanner so that a high quality, useable image can be obtained.

Capture of images of opposite sides of the document can be performed concurrently, or on separate passes of a document along the path of travel 204. For example, one of the contact image scanners 212, 312 can be a higher-speed component capable of operation at the same rate as the MICR reader, while cost savings are realized through use of a lower cost scanning component for the other of the two scanners. Alternatively, both scanners can be low-cost, low speed scanners (lower than the minimum MICR read speeds), and both operate on a second or subsequent pass of a document along the path of travel 204.

In the embodiment shown in FIG. 4, the housing 202 and path of travel 204 can be elongated to allow inclusion of the contact image scanner 312 or other document processing components as previously described.

Furthermore, although in FIGS. 3-4 the path of travel 204 is shown as resulting in a side-entry, top exit document processor, other shapes can be provided for the path of travel as well. For example, the path of travel can be straight (side entry and exit) or U-shaped (either top entry and exit or side entry and exit). Furthermore, although the document processors 200, 300 of FIGS. 3-4 are shown as receiving documents that are horizontally oriented, the document processors can equivalently be arranged such that the documents are received in a vertical orientation, or any other angled orientation that benefits ergonomics and ease of operation.

Now referring to FIGS. 5-8 a series of front perspective schematic views of a document processor 400 receiving a check 450 for processing are shown. The figures are intended to illustrate one example operation in processing a document, according to aspects of the present disclosure. The document processor 400 can, in various embodiments, correspond to any of the types of document processors 200, 300 previously described, and includes a housing 402 having a side entry opening 404 and top exit opening 406 defining opposite ends of a path of travel (not shown) of a document passing through the document processor.

The document processor 400 is shown in FIG. 5-8 to include a MICR reader 408 and contact image scanner 410, in broken lines to signify that these components are internal to the document processor. In the figures, the MICR reader 408 and contact image scanner 410 are shaded when active during a document processing operation.

Figure 5:
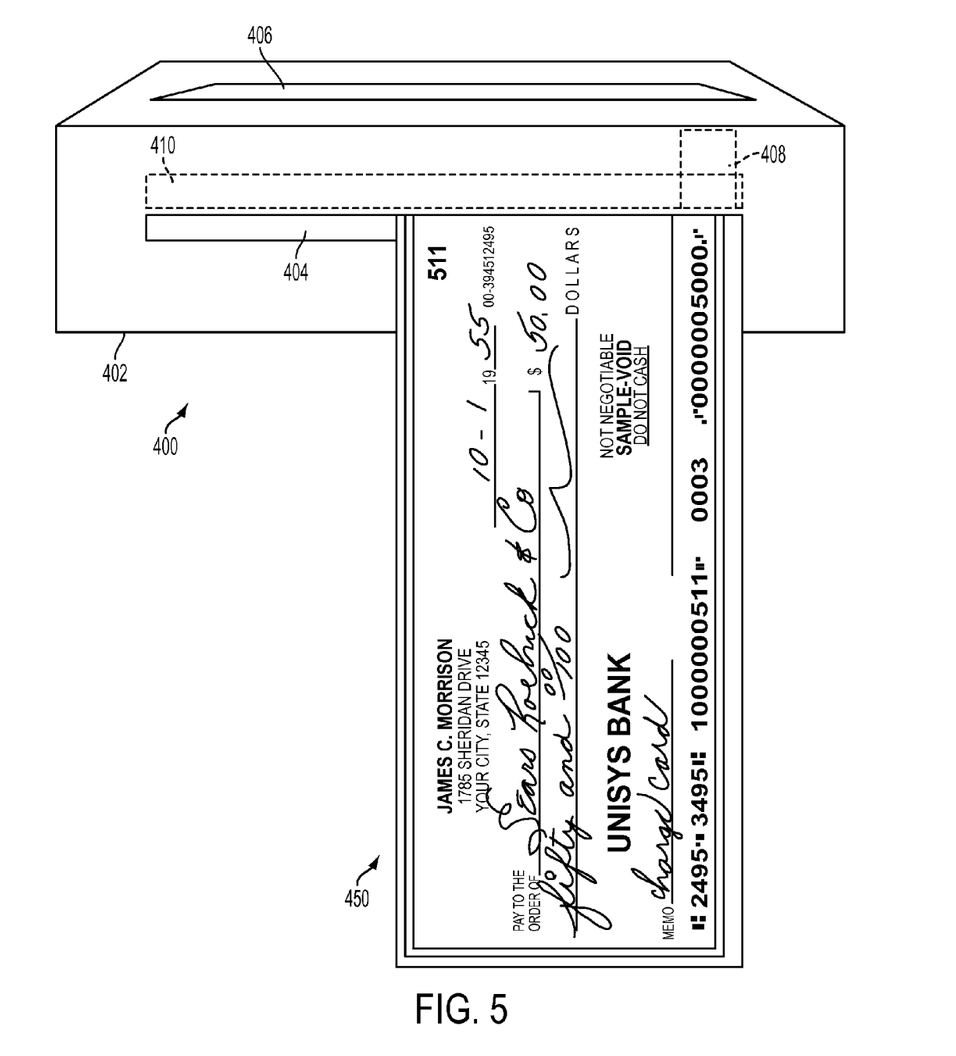
FIG. 5 is a front perspective view of a document processor receiving a check to be processed, according to a possible embodiment of the present disclosure.

FIG. 5 corresponds to initial insertion of a check into the side entry opening 404 of the document processor 400. As illustrated, when the check 450 is first inserted, neither the MICR reader 408 nor the contact image scanner 410 is active (as signified in that neither element is shaded).

Figure 6:
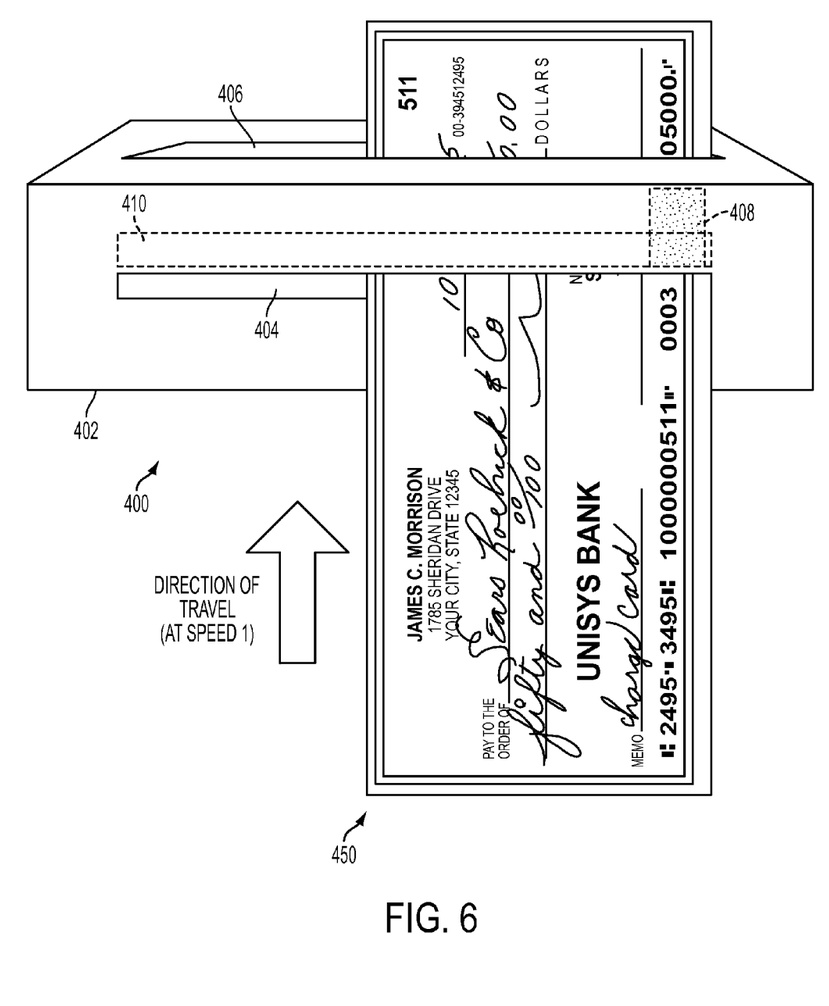
FIG. 6 is a front perspective view of the document processor of FIG. 5 performing a first pass on the check.

FIG. 6 illustrates a first document processing operation (e.g. operation of a first document processing module as described in FIG. 2, above). In this figure, the check 450 is illustrated as passing into the side entry opening 404 and along the path of travel at a first programmed speed. The check 450 is engaged by drive rollers (e.g. drive rollers 208 shown in FIGS. 3-4) to pull the document along the path of travel at the programmed, preselected first speed. In the embodiment shown, as the document is received into the document processor 400, the MICR reader 408 is active, and reading a MICR code line printed on the check 450. Therefore, the first programmed speed (indicated as "Speed 1" in FIG. 6) is generally a speed that is sufficient to allow reliable MICR operation, typically at least about 5 inches per second, as previously mentioned.

Figure 7:
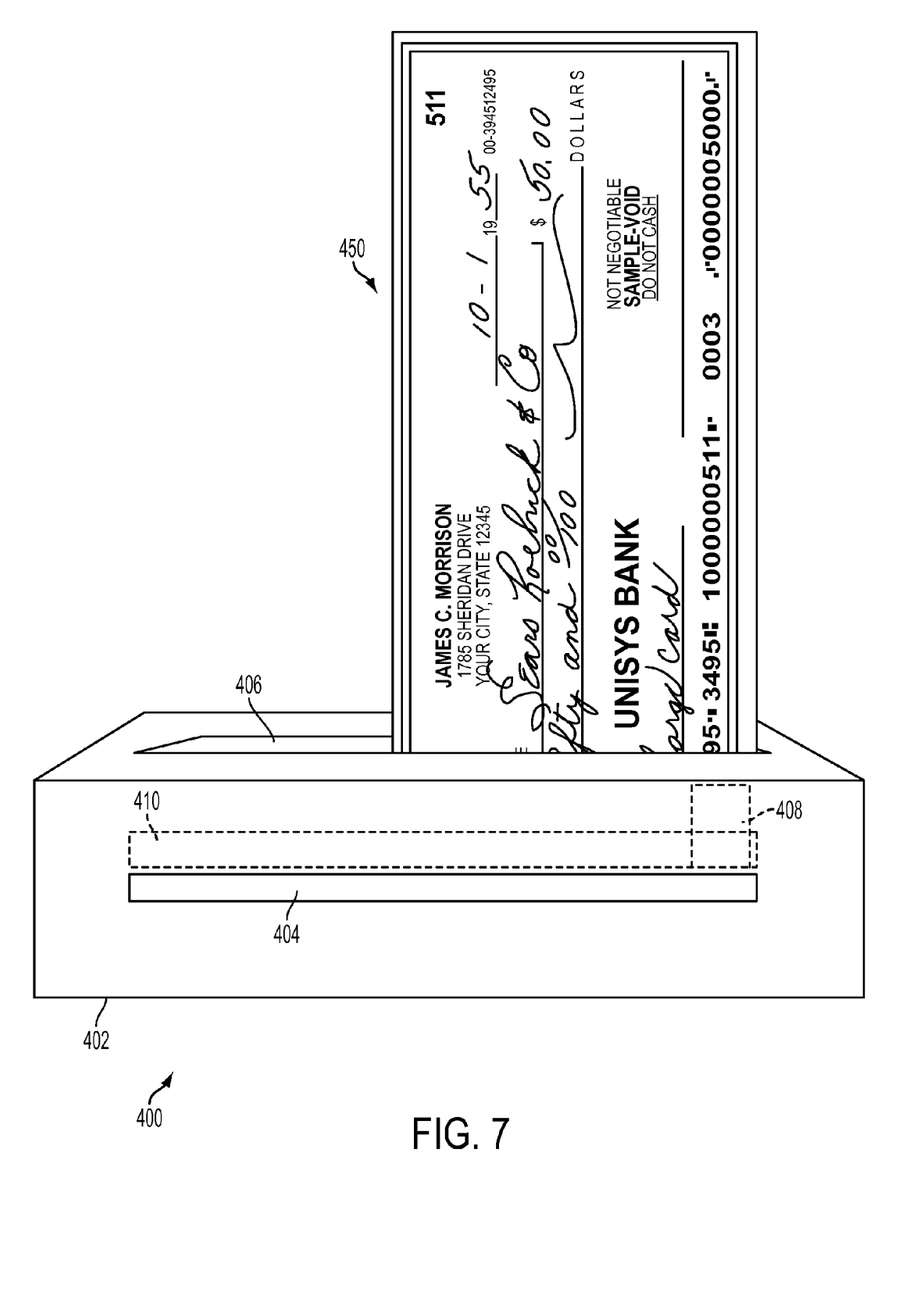
FIG. 7 is a front perspective view of the document processor of FIG. 5 after completion of the first pass on the check

FIG. 7 illustrates the state of the document processor 400 after completion of the first document processing operation of FIG. 6. At this point, the document (shown as check 450) has passed the document processing components within the document processor 400, and is held within the document processor between a drive roller and a pinch roller. The check 450 extends from the top exit opening 406.

If the first document processing operation fails (e.g. the MICR read fails), the document processor 400 can continue to move the check 450 forward through the path of travel and expel the check from the top exit opening 406. Alternatively, the document processor 400 can reverse the direction of the drive rollers, and expel the check 450 from the side entry opening 404 (as shown in FIG. 5).

Figure 8:
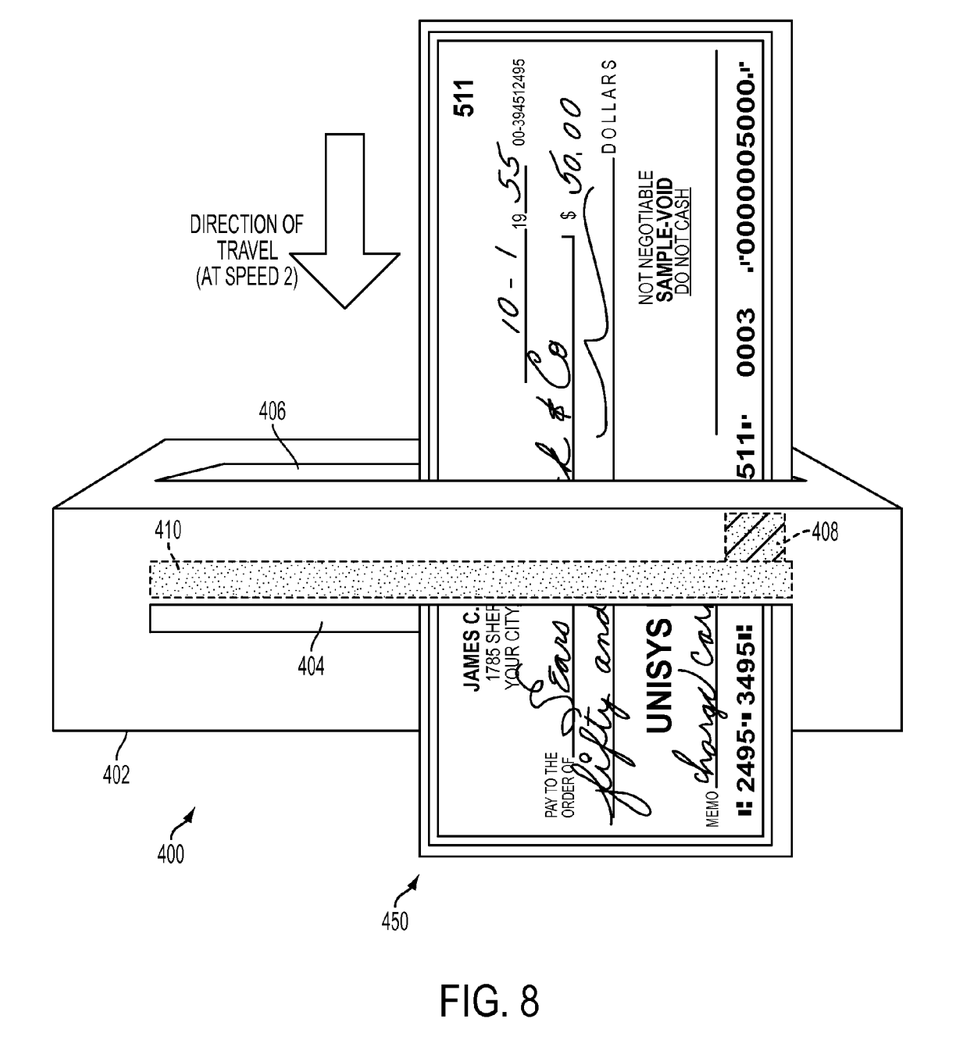
FIG. 8 is a front perspective view of the document processor of FIG. 5 performing a second, opposite direction pass on the check.

FIG. 8 illustrates a second document processing operation (e.g. operation of a second document processing module as described in FIG. 2, above). In this figure, the check 450 is illustrated as passing backward through the document processor 400, in a direction opposite that shown in FIG. 6. The check 450 is driven by the drive rollers at a second speed (shown in FIG. 8 as "Speed 2"). In the embodiment shown, as the document is moved through the document processor in this second direction and at this second speed, the scanner 410 is active, capturing an image of the check. In some embodiments, the second speed is coordinated with the optimal speed of the scanner 410 included in the document processor, to ensure a high quality, useable image.

In certain embodiments, the scanner 410 can operate at a speed sufficient that MICR reading is possible. In such embodiments (as in the one shown) the MICR reader 408 is also optionally active (as indicated by the lined, shaded MICR reader 408 of FIG. 8), and obtains an inverse MICR signal reading from the check 450. This inverse MICR signal can be compared to the signal obtained from the characters read in the first direction. Details regarding dual-pass reading of MICR signals are described in U.S. patent application Ser. No. 11/950,461 (Unisys Ref. No. PM110), filed Dec. 5, 2007, the disclosure of which is hereby incorporated by reference in its entirety.

In other embodiments, the scanner 410 is a low-cost scanner, and operates at a speed lower than that of the MICR reader 408 (e.g. having a linear document speed of less than about 5 inches per second). In such instances, the MICR reader 408 is inactive during the second document processing operation.

Following completion of the second document processing operation, the check 450 is returned to the user from the side entry opening 404. FIG. 5 also therefore corresponds to completed processing of a check, and return of the check 450 to the user of the system 400.

Figure 9:
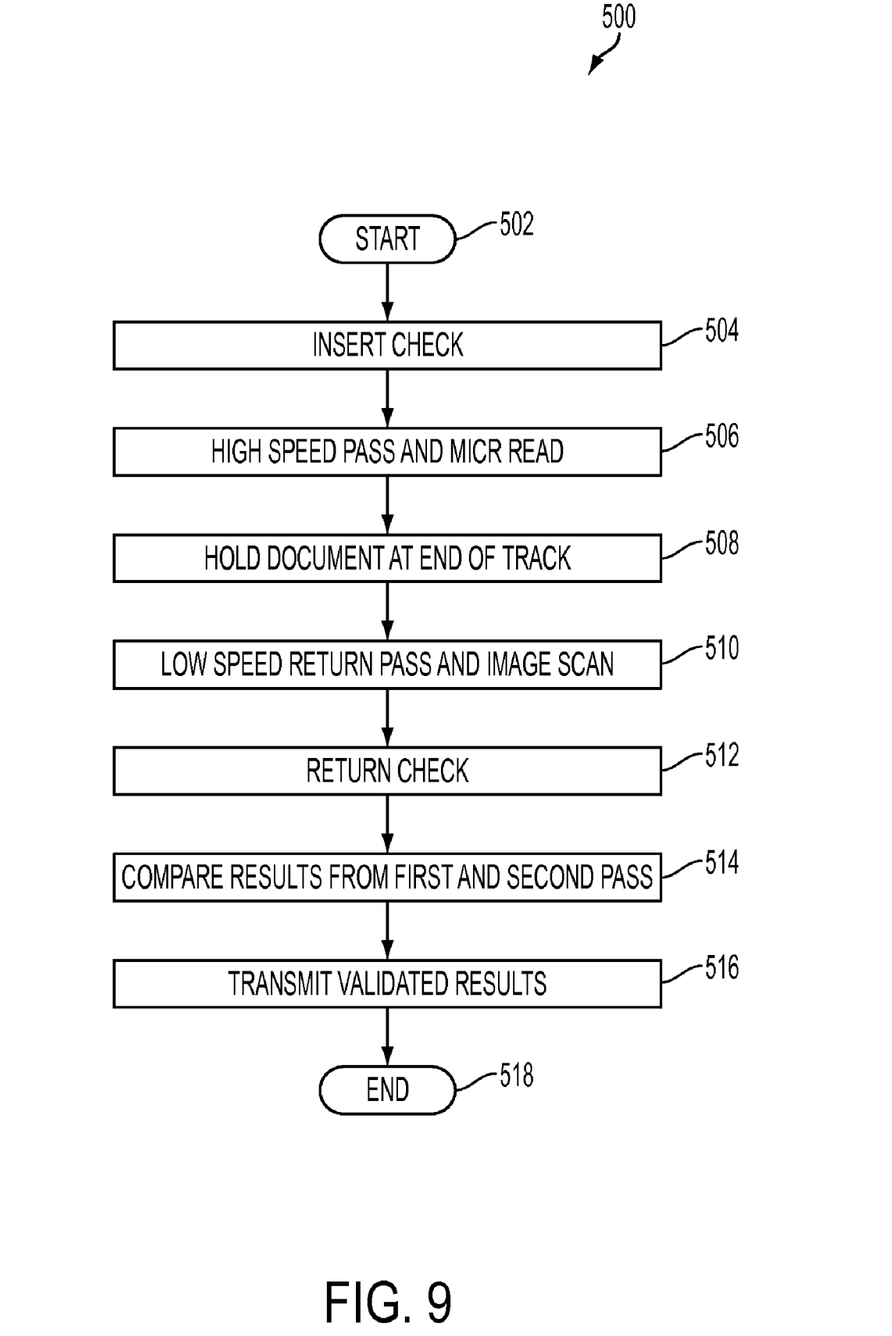
FIG. 9 is a flowchart illustrating methods and systems for processing a check using a document processor according to a possible embodiment of the present disclosure.

FIG. 9 is a flowchart illustrating methods and systems for processing a check using a document processor according to a possible embodiment of the present disclosure. FIG. 9 therefore corresponds to a particular application of the methods and systems described above (particularly as described in FIG. 2), as relating to check processing following a financial transaction. The system 500 of FIG. 9 can be performed using a document processor as described herein, optionally as included within a financial network as illustrated in FIG. 1. For example, the system 500 can be performed using control circuitry and software in the document processor, or in a computer communicatively connected to the document processor.

The system 500 of FIG. 9 is instantiated at a start operation 502, which corresponds to introduction of a check (e.g. by a user or automated feeder mechanism) for processing. A check insertion module 504 detects the document and receives the document into a document processor (e.g. as illustrated in FIG. 5, above). The check insertion module receives the check to be processed into a path of travel of documents. The path of travel can be, in various embodiments, defined by a housing, guides, pressure rollers, drive rollers, and other mechanical components arranged to guide checks along a predetermined route through the document processor. In the embodiment shown in FIGS. 5-8, the document path begins at a front entry opening and ends at a top exit opening. The check insertion module 504 can be manually activated (e.g. by pressing a "start" button on a document processor) or by automatically detecting the presence of the received document.

A high speed document processing module 506 draws the check into the document processor and guides the check along a path of travel at a first, predetermined speed of at least about 5 inches per second. The high speed document processing module 506 draws the check in a first direction through the document processor, shown in FIG. 5 as being received into a side entry opening and toward a top exit opening. While the check is being drawn along the path of travel, the high speed document processing module performs a MICR read operation on the check using a MICR reader (e.g. as illustrated in FIG. 6, above).

A hold module 508 halts movement of the check along the path of travel such that it is held by a drive roller and pinch roller after being read by the MICR reader. One example illustration of operation of the hold module is shown above in FIG. 7.

Following the hold module 508, a low speed document processing module 510 reverses the direction of the check within the path of travel by reversing rotation of the drive rollers within the document processor. The low speed document processing module 510 returns the check in a second direction opposite the first direction, shown in FIG. 8 to be back through the top exit opening and toward the front entry opening. The low speed document processing module 510 operates at a second speed, typically less than about 5 inches per second, but in certain embodiments higher speeds are possible as well.

While the check is being returned in the second direction along the path of travel, the low speed document processing module 510 performs a scan operation using a contact image scanner. The low speed document processing module can also perform an optional second MICR read if the second speed is sufficiently fast, as previously described.

A return check module 512 returns the check to the user, as illustrated again in FIG. 5.

A comparison module 514 can optionally be performed to compare results obtained from the high speed document processing module 506 and the low speed document processing module 510. As previously mentioned, the comparison module 514 can perform a comparison between captured MICR signals to improve reliability of character reading. Other data capture or validation comparisons or tests can be performed as well.

A transmission module 516 optionally transmits the captured information to a system remote from (i.e. separate from) the document processor. For example, the transmission module 516 can transmit the captured MICR and image information to a communicatively connected computing system, or a server at a financial institution as illustrated in FIG. 1, above. Other systems can receive this information as well.

Operational flow in the system is terminated at an end operation 518, which signifies completed processing of the check by the document processor. At this point, the check is returned to the user of the document processor for storage, destruction, or forwarding to a financial institution.

Referring to FIG. 9 in general, the system 500 has a number of operational and timing considerations, which are discussed in conjunction with the operation of the document processor of FIGS. 5-8; however, where not stated, no specific dependency in order of operations or operational modules is implied. Furthermore, additional modules may be included, such as to perform additional document processing steps as required by a financial institution, statute, regulation, or business requirement.

Overall, although the present disclosure is discussed in conjunction with a compact document processor, and in particular a system for processing checks, it is understood that the same operational principles apply in larger systems, or systems that process other types of documents. In this way, cost savings can be applied to document processors by matching component speeds and separating document process steps using different components, so that lowest-cost components can be used for each document processing operation.

The above specification, examples and data provide a complete description of the manufacture and use of the composition of the invention. Since many embodiments of the invention can be made without departing from the spirit and scope of the invention, the invention resides in the claims hereinafter appended.

The invention claimed is:

1. A method of processing documents, the method comprising:
   receiving a document in a document processor;
   passing the document through the document processor along a path of travel in a first direction at a first speed and concurrently performing a first document processing operation with a first device in the document processor, the first document processing operation includes reading magnetic ink characters printed on the document; and
   passing the document through the document processor along the path of travel in a second direction opposite the first direction and at a second speed slower than the first speed and concurrently performing a second document processing operation with a second device in the document processor, wherein the second device is incapable of operation at the first speed.

2. The method of claim 1, further comprising performing a second iteration of the first document processing operation while passing the document through the document processor in the second direction.

3. The method of claim 2, further comprising comparing results from the first document processing operation and the second iteration of the first document processing operation.

4. The method of claim 1, wherein the second document processing operation includes capturing an image of a surface of the document.

5. The method of claim 1, wherein the second device includes a contact Image scanner.

6. The method of claim 1, wherein the first device includes a magnetic ink character reader.

7. A method of processing checks comprising:
   receiving a check in a check processor;
   passing the check through the check processor along a path of travel in a first direction at a first speed;
   while passing the check through the check processor in the first direction, reading magnetic ink characters printed on the check using a magnetic ink character reader in the check processor;
   after the magnetic ink characters printed on the check are read by the magnetic ink character reader, halting movement of the check;
   passing the check through the check processor in a second direction opposite the first direction at a second speed lower than the first speed;
   while passing the check through the check processor in the second direction, capturing an image of the front side of the check using a contact image scanner;
   wherein the contact image scanner is incapable of operation at the first speed.

8. The method of claim 7, wherein the magnetic ink character reader is incapable of operation at the second speed.

9. The method of claim 7, further comprising:
   reading the magnetic ink characters using the magnetic ink character reader while passing the check through the check processor in the second direction; and
   comparing the magnetic ink characters read by the image processor in the first direction and the second direction.

10. The method of claim 7, further comprising transmitting the magnetic ink characters and the image to a remote system via a payment network.

* * * * *